United States Patent [19]
Bergen

[11] Patent Number: 5,684,435
[45] Date of Patent: Nov. 4, 1997

[54] ANALOG WAVEFORM COMMUNICATIONS REDUCED INSTRUCTION SET PROCESSOR

[75] Inventor: Ronald L. Bergen, Irvine, Calif.

[73] Assignee: Hughes Electronics, Los Angeles, Calif.

[21] Appl. No.: 653,930

[22] Filed: May 22, 1996

[51] Int. Cl.[6] .............................. H03C 3/00; H03D 3/00
[52] U.S. Cl. ................... 332/117; 329/341; 375/271; 375/302; 375/324
[58] Field of Search ........................... 332/117; 329/341; 375/271, 302, 324

[56] References Cited

U.S. PATENT DOCUMENTS 4,884,265  11/1989  Schroeder et al. .................... 370/70
5,550,869   8/1996  Gurantz et al. ...................... 329/306

Primary Examiner—Siegfried H. Grimm
Attorney, Agent, or Firm—V. D. Duraiswamy; M. W. Sales; W. K. Denson-Low

[57] ABSTRACT

A communications reduced instruction processor forming a simple programmable digital signal processing architecture (10) for processing analog waveforms. The architecture (10) includes a main DSP core that includes a tightly coupled CORDIC co-processing element (26). The CORDIC co-processing element (26) performs trigonometric operations for converting polar coordinates to rectangular coordinates and rectangular coordinates to polar coordinates. These trigonometric functions include an angle accumulate operation for calculating the magnitude and angle of a vector given in X-Y cartesian coordinates, and a vector rotate operation for calculating a sine and a cosine of a given phase angle.

16 Claims, 3 Drawing Sheets

ANALOG WAVEFORM COMMUNICATIONS REDUCED INSTRUCTION SET PROCESSOR

BACKGROUND OF THE INVENTION

1. Field of the Invention

This invention relates generally to a processor for the modulation and/or demodulation of various analog waveforms and, more particularly, to an integrated circuit digital signal processor for the modulation and/or demodulation of analog waveforms in which the processor incorporates a CORDIC trigonometric processing element coupled to a main digital signal processing core.

2. Discussion of the Related Art

Various analog waveforms, such as amplitude modulation (AM) waveforms, frequency modulation (FM) waveforms, FM stereo waveforms and single side band suppressed carrier (SSB-SC) waveforms, are modulated for transmissions and demodulated after reception. As is well understood in the art, modulation is a technique by which a signal is superimposed on a carrier wave to increase transmission efficiency of the signal. Once the signal is received by a receiver, the receiver demodulates the signal from the carrier wave for subsequent processing so as to extract the usable data. These types of analog waveforms are used in many different communications and control systems, such as vehicle stereo systems.

As is well understood in the art, to modulate and demodulate analog waveforms, it is necessary to incorporate components that perform various trigonometric functions to convert rectangular coordinates to polar coordinates and polar coordinates to rectangular coordinates. Various algorithms are known that are able to generate sine and cosine values from a phase angle, and also generate phase and magnitude values from X and Y coordinates to perform the conversions. Processor based modulation and demodulation systems are programmed with the necessary algorithms for performing these trigonometric functions.

Modulation/demodulation systems for analog waveforms have been known to be either analog or digital based systems. For digital based systems, known implementations of multi-band programmable waveform modulators/demodulators have required the use of several digital signal processor (DSP) devices, and their associated support integrated circuits, such as random access memories (RAMs), read only memories (ROMs) and (PLDs). These implementations generally use either software-based series approximations, ROM based look-up tables, or external co-processors to perform the required trigonometric computations for these waveforms.

The known approaches to modulating and demodulating analog waveforms in digital circuits can be improved upon to make the modulator/demodulator more efficient, faster, and less costly. It is an object of the present invention to provide an analog waveform modulator/demodulator digital circuit architecture that has significant advantages over known modulators/demodulators of this type.

SUMMARY OF THE INVENTION

In accordance with teachings of the present invention, an analog waveform communications reduced instruction processor (CRISP) forming a simple programmable digital signal processing architecture is disclosed for processing analog waveforms. The architecture includes a main DSP core that includes a tightly coupled CORDIC co-processing element. The CORDIC co-processing element performs trigonometric operations for converting polar coordinates to rectangular coordinates and rectangular coordinates to polar coordinates for modulating and demodulating the analog waveforms. The trigonometric operations include an angle accumulate mode that calculates the magnitude and angle of a vector from its X and Y coordinates, and a vector rotate mode to determine sine and cosine of a given phase angle. Trigonometric conversions of this nature allow the processing architecture to effectively modulate and demodulate analog waveforms.

Additional objects, advantages and features of the present invention will become apparent from the following description and appended claims, taken in conjunction with the accompanying drawings.

DETAILED DESCRIPTION OF THE PREFERRED EMBODIMENTS

The following description of the preferred embodiments directed to an analog waveform communications reduced instruction processor for modulation and/or demodulation of analog waveforms is merely exemplary in nature and is in no way intended to limit the invention or its applications or uses.

Figure 1:
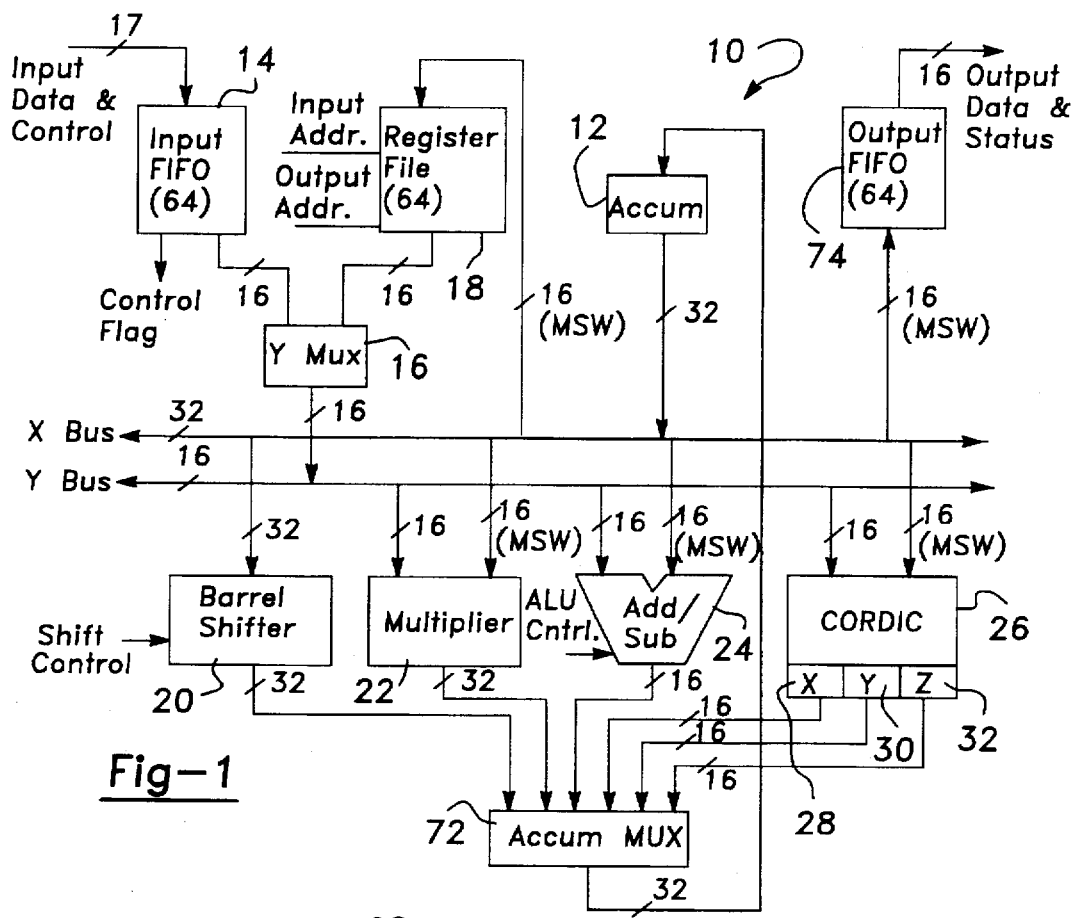
FIG. 1 is a block diagram of a CRISP architecture for modulating/demodulating an analog waveform according to an embodiment of the present invention.

FIG. 1 is a block diagram of the architecture of a communications reduced instruction processor (CRISP) 10 according to an embodiment of the present invention. The CRISP architecture 10 includes various components, that will be discussed below, to perform modulation or demodulation of a stream of digital input data. The data is manipulated by the architecture 10 on a 32-bit X data bus and a 16-bit Y data bus. The architecture can be programmed using various algorithms that perform transformations from rectangular coordinates to polar coordinates and polar coordinates to rectangular coordinates in association with trigonometric functions of the algorithms in order to perform the modulation and/or demodulation of the digital data. In this embodiment, the primary bit width of the architecture 10 is set at 16 bits, where multiplication processes produce a 32-bit output, but data memory and input/output (I/O) functions are limited to 16-bits. All operations are performed using twos complement arithmetic. Of course, other processing parameters for other specific architectural designs can be used within the scope of the invention.

The CRISP architecture 10 is accumulator based by a 32-bit accumulator 12. The accumulator 12 acts as the main data register of the architecture 10. All data operations make use of the accumulator 12, either as the source of an operand (address location), or as the destination for the result of an operation, except multiplication and barrel shifting (discussed below). Multiplication uses the most significant 16-bit word of the accumulator 12 as a multiplier input, and uses the entire 32-bit accumulator 12 to store the output.

The input data and a control signal to the architecture 10 are applied as a 17-bit input to a 64 word deep input first-in-first-out (FIFO) 14. The input data applied to the FIFO 14 can come from a tuner IC (not shown) for waveform demodulation, or from a baseband data source for waveform modulation. One of the 17 bits acts as a control bit and is output from the FIFO register 14 as a control flag. The other 16 bits are output from the input FIFO register 14 to a Y-multiplexer 16. Data being operated on from the X bus is stored in a data memory comprising a dual-ported synchronous RAM register file 18. The register file 18 is set at 64 words, with a width of 16 bits. A 16-bit output from the register file 16 is also applied to the Y-multiplexer 16 depending on a control signal output address.

A 32-bit output from the X bus is applied to a barrel shifter 20. As is well understood in the art, barrel shifting is an operation that performs a shift in which a data bit can be shifted in the barrel shifter 20 as many places as exist in the shifter 20 in a single clock cycle. The barrel shifter 20 accepts a 32 bit input from the accumulator 12 and outputs a 32 bit output to the accumulator 12. Operations occur in a single clock period. The barrel shifter 20 accepts an immediate operand in the instruction word specifying the direction and size of a shift.

The most significant word (MSW) 16 bits from the X bus is applied to a multiplier 22 along with the 16 bits from the Y Bus. The multiplier 22 operates on the 16-bit inputs and yields a 32-bit output. One input is provided by the accumulator 12, and the other input is from the register file 18. A 32-bit output is Written back into the entire 32-bit accumulator 12. Operations in the multiplier 22 operate in a single clock cycle.

An arithmetic logic unit (ALU) 24 also receives the 16-bit MSW from the X bus and the 16 bit data from the Y bus. The ALU 24 performs two's complement addition and subtraction. The precision of the data output is equal to that of the input operands, i.e., 16 bits. One input operand is taken from the accumulator 12 (MS word), and the other is taken from the specified register file location. The output of the operation is placed back in the accumulator 12. The ALU 24 is also used to pass an input register file value directly through to the accumulator 12, without modification.

The operation of the various FIFOs, register files, multiplexers, barrel shifters, multipliers, accumulators, and ALUs discussed above are well known to those skilled in the art as being typical components of high performance digital processor architecture. The specific operations of these components referred to above would be known, and therefore need not be discussed in specific detail here.

A CORDIC processor 26 also receives the 16-bit MSW from the X bus and the 16 bit data from the Y bus. The CORDIC processor 26 performs two types of trigonometric operations. These operations include an angle accumulate operation mode and vector rotate operation mode. The angle accumulate mode is used to calculate the magnitude and angle of a vector, given in X-Y cartesian coordinates. The vector rotate mode is used to calculate the sine and cosine of a given phase angle inputs are taken from the accumulator 12 and a location in the register file 18 for the angle accumulate mode, or from just the accumulator 12 in the vector rotate mode. Outputs are placed in two of three possible CORDIC processor output registers, namely, a CORDIC X-register 28, a CORDIC Y-register 30, or a CORDIC Z-phase register 32. In the angle accumulate mode, the magnitude is output to the CORDIC X-register 28, and the phase is output to the CORDIC Z-register 32. In the vector rotate mode, the cosine output is available in the CORDIC X-register 28, and the sine output is available in the CORDIC Y-register 30. The CORDIC operation requires 16 clock cycles to complete its computation (1 clock cycle per input bit). Other non-CORDIC processing may proceed concurrently with the CORDIC processor 26 working on the calculations.

The use of CORDIC processors in various digital signal processing applications to perform trigonometric functions of the type discussed above is known in the art. The trigonometric mathematical derivations performed by these types of processors is well documented in the literature. For one example of a particular derivation of a trigonometric algorithm used in coordinate rotation for a CORDIC processor, see Blahut, Richard E., "Fast Algorithms for Digital Signal Processing," Addison-Wesley Publishing Co., pp. 348–350.

Figure 2:
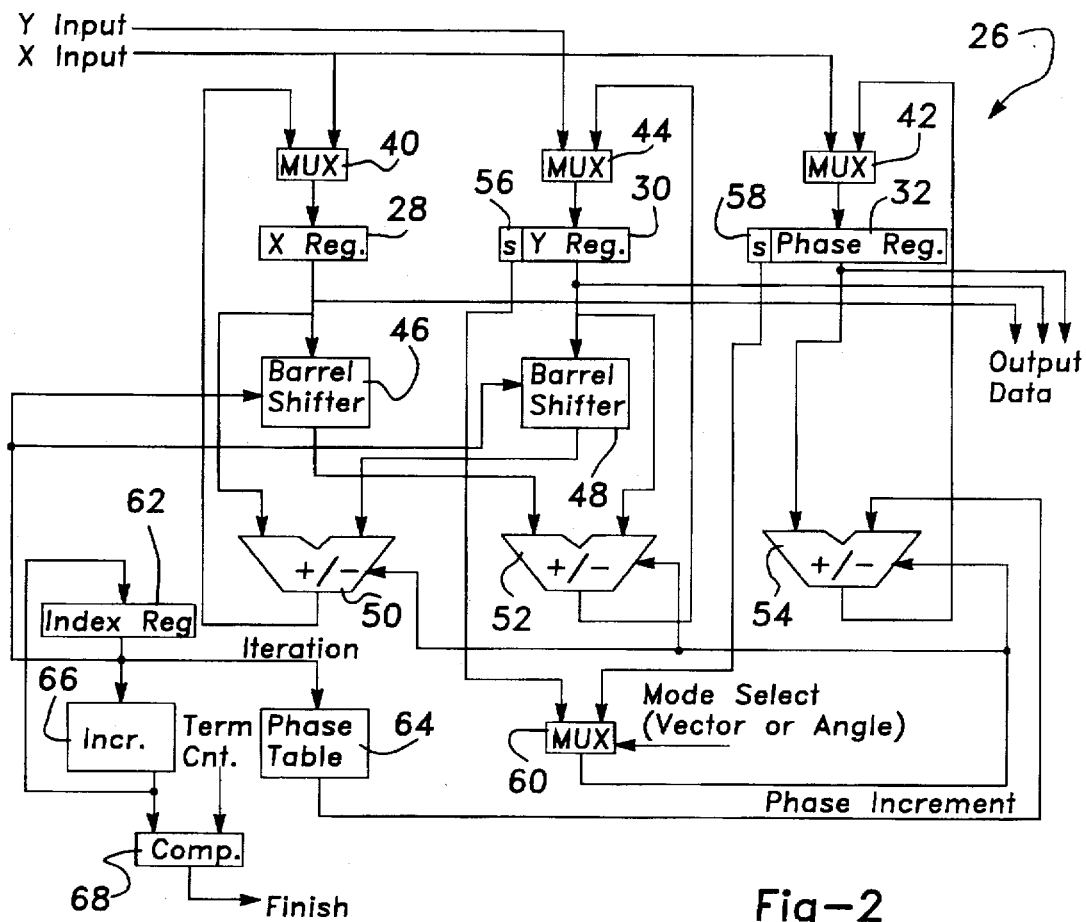
FIG. 2 is a block diagram of the architecture of a CORDIC processor associated with the CRISP architecture of FIG. 1.

A block diagram of the architecture of the CORDIC processor 26 is shown in FIG. 2. This particular architecture of the CORDIC processor 26 is illustrated as a non-limiting example, in that other CORDIC architectures for other applications of specific trigonometric algorithms can be used to perform modulation and/or demodulation of an analog waveform within the scope of the present invention. The 16 MSW from the X bus is multiplexed into the X-register 28 through a multiplexer 40, and into the Z-phase register 32 through a multiplexer 42. The 16 bit data word from the Y bus is multiplexed into the Y-register 30 through a multiplexer 44. An output of the X-register 28 is applied to a barrel shifter 46, and the output of the Y-register is applied to a barrel shifter 48. Additionally, an output from the X-register 28 is applied to an ALU 50 along with an output from the barrel shifter 48, and an output of the Y-register 30 is applied to an ALU 52 along with an output of the barrel shifter 46, as shown. The ALUs 50 and 52 perform addition and subtraction functions in the CORDIC processor 26. Likewise, an output from the Z-phase register 32 is applied to an ALU 54 to perform addition and subtraction functions. An output from the ALU 50 is applied to the multiplexer 40 to be multiplexed into the X-register 28, an output of the ALU 52 is applied to the multiplexer 44 to be multiplexed to the Y-register 30, and an output of the ALU 54 is multiplexed into the Z-phase register 32 by the multiplexer 42. A single bit S-register 56 of the Y-register 30 and a single bit S-register 58 of the Z-phase register 32 are applied to a multiplexer 60. These signals are multiplexed by the multiplexer 60 into the ALUs 50, 52 and 54, as shown.

An output from an index register 62 is applied to the barrel shifters 46 and 48, and to a phase table 64. An output of the phase table 64 is applied to the ALU 54 as a phase increment signal. Additionally, an output of the index register 62 is applied to a register 66. The output of the register 66 is applied to the index register 62 and to a register 68.

The CORDIC processor 26 as depicted in FIG. 2 operates in an iterative manner. The iterative operation of a CORDIC algorithm for the CORDIC processor 26 is well known in the art (see for example Blahut referenced above) and therefore, this operation need not be discussed in detail.

Returning to FIG. 1, corresponding outputs from each of the barrel shifter 20, the multiplier 22, the ALU the CORDIC X-register 28, the CORDIC Y-register 30 or the CORDIC Z-register 32 are output to an accumulator multiplexer 72. The appropriate selected output from the accumulator multiplexer 72 is applied to the accumulator 12 as a 32-bit word.

Output data from the X bus is output as the 16-bit MSW to an output FIFO 74. A control signal applied to the output FIFO 74 provides the output data as a 16 bit-word.

Figure 3:
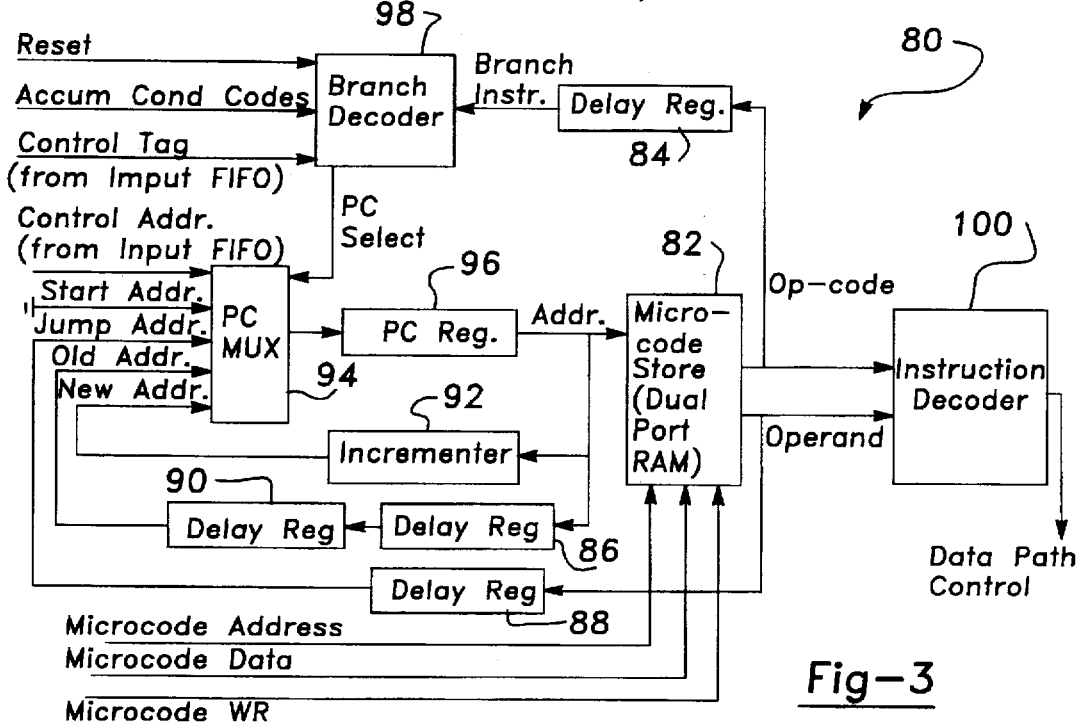
FIG. 3 is a control block diagram for the CRISP architecture depicted in FIG. 1.

The architecture 10 represents the data portion of the processor of the invention. FIG. 3 shows a block diagram of a control architecture 80 that controls the architecture 10. The control architecture 80 includes a microcode store 82 that is a 256 word synchronous dual port RAM. The microcode store 82 stores the algorithmic micro-code routines necessary for demodulation and modulation of analog waveforms. As illustrated, the microcode store 82 receives various microcode inputs, including a microcode address, microcoded data and a microcode write (WR) from an external device to load the microcode store 82. The CRISP microcode access circuitry interfaces with the read only side of the microcode store 82, and the write only side of the microcode store 82 interfaces to a control bus which is used to download to the microcode store 82.

A series of delay registers 84, 86, 88 and 90 clock the value of the opcodes (operation codes) in the instruction sequences by one clock cycle in order to coordinate the timing of the instruction pipeline. These registers perform a single clock operation to hold an instruction opcode and address for one clock cycle. An incrementer 92 increments the current value of a PC register 96 for sequential execution of micro-code instructions. A program counter (PC) multiplexer 94 is used to select the next micro-code address. The PC multiplexer 94 allows the program to be stepped through the instruction sequence for a given program. A branch decoder 98 receives various inputs, as shown, and the opcode from the microcode store 82 through the delay register 84. The branch decoder 98 selects the source of the next value for the PC register 96 by controlling which of the inputs to the PC multiplexer 94 is applied to the PC register 96. This is the control mechanism that decides what instruction to execute next based on the current opcode and accumulator condition codes.

The opcode and operand from the microcode store 82 are applied to an instruction decoder 100. The instruction decoder 100 takes the operand and the opcode, and based upon what the opcode is, will decide what control lines to generate the control on to move the data around the CRISP architecture 10. This operation basically does a decode of what the opcode is telling it to do. The output from the instruction decoder 100 is actually a plurality of outputs that are applied to the various components of the architecture 10. These control connections to these components are not shown in the interest of clarity.

The architecture 80, including the various architectural components as just described, are well known components for controlling a high performance CPU architecture, such as the CRISP architecture 10. Therefore, the specific operation of each of these components need not be discussed here. As will be appreciated by those skilled in the art, other configurations of control architecture could be used to control the architecture 10 within the scope of the present Invention.

The Cordic algorithm in the microcode store 82 accepts and returns X and Y data in Q14 twos complement format, and handles the data in Q15 format. X and Y input data for the angle accumulate mode should be scaled to a magnitude of less than one to avoid overflows. The Z data is normalized high.

A particular CRISP instruction set is given in Table I below. Table I gives the instruction command, the operand of the instruction and a description of the operation. Additionally, the number of clock cycles is given for each instruction. The instruction length is fixed at 12 bits for all instructions, where the opcode field is 4 bits and the operand field is 8 bits.

TABLE I

| Instruction | Operand | Description | Cycles |
|---|---|---|---|
| Load | Rn or Input FIFO | Rn – > Accum (MSW) or Input FIFO – > Accum (MSW) | 1 |
| Store | Rn or Output FIFO | Accum (MSW) – > Rn or Accum (MSW) – > Output FIFO | 1 |
| Add | Rn | Accum (MSW) + Rn – > Accum (MSW) | 1 |
| Sub | Rn | Accum (MSW) – Rn – > Accum (MSW) | 1 |
| Mult | Rn | Accum (MSW) *Rn – > Accum (MSW:LSW) | 16 |
| Corda | Rn | Cordic Angle Accumulate Accum (MSW) (x), Rn (y) – > cordic __x(mag), cordic __z (phase) | 16 |
| Cordv | none | Cordic Vector Rotate Accum (MSW) (phase) – > cordic __x(cos), cordic __y (sin) | 1 |
| Shift | Immediate | Operand specifies direction and magnitude of shift: (+) for left shift, (–) for right shift. Range: +16 to –15. | 1 |
| Jmp | Absolute Address | Jump to absolute address | 1 |
| Jmpnz | Abs. Addr. | Jump if accumulator MS word < >0 | 1 |
| Jmpz | Abs. Addr. | Jump if accumulator MS word = =0 | 1 |
| Jmpge | Abs. Addr. | Jump if accumulator MS word >=0 | 1 |
| Jmpgt | Abs. Addr. | Jump if accumulator MS word >0 | 1 |
| Jmple | Abs. Addr. | Jump if accumulator MS word <= 0 | 1 |
| Jmplt | Abs. Addr. | Jump if accumulator MS word <0 | 1 |
| Loadc | None | Read control word from input FIFO and jump to location specified by control word. | 1 |

The FIFOs 14 and 74 appear as input or output registers to the program stored in the microcode store 82, and are accessed using the load or store instructions. The depth of each FIFO 14 and 74 is 64 words, and the data is 16 bits wide. The input FIFO 14 also has an extra, non-data flag bit, making its total width 17 bits. The flag bit is used to indicate to the control circuitry when the current FIFO output is a data word or a control word location. A loadc instruction causes the input FIFO 14 to be read for a control word. The input FIFO 14 is read repeatedly until a control word is found. The lower eight bits of the control word are then multiplexed into the architecture 10. Therefore, a control word input into the input FIFO 14 can be used to direct the CRISP architecture 10 to execute a routine at a specified microcode location. The loadc instruction protects against branching into left field if a data and control contained in the input FIFO 14 ever become misordered.

Figure 4:
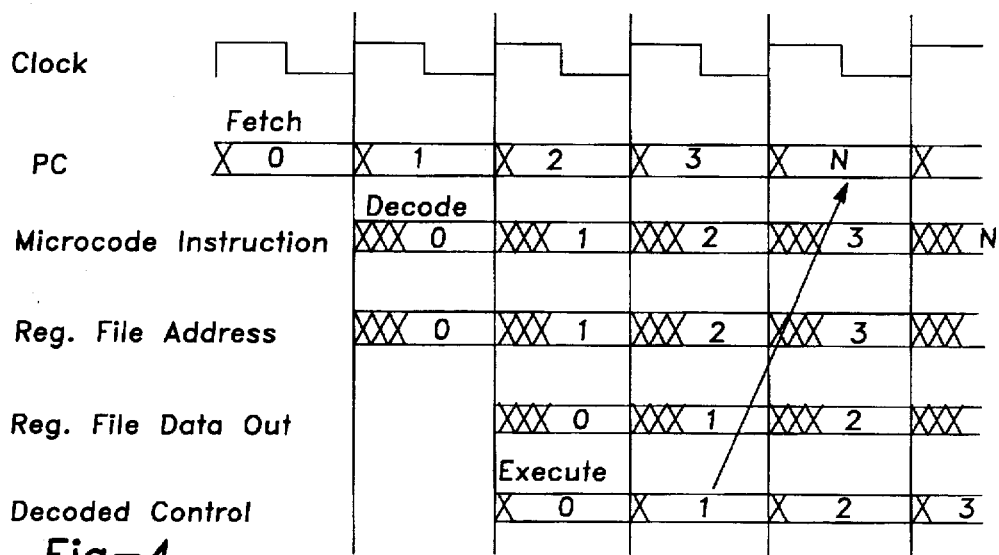
FIG. 4 is a diagrammatic illustration of the three stage instruction execution pipeline of the CRISP architecture.

FIG. 4 shows an example of the three stage instruction pipeline having a jump at instruction 1. The three stages of the pipeline execution include an instruction fetch, an instruction decode and an instruction execution. The first line gives a clock cycle to show where each instruction is performed. A PC line indicates the instruction number being fetched. The jump instruction performs a delayed jump, i.e., the two instructions immediately following the jump are executed before the instruction being jumped to is executed. It is possible to avoid executing the two instructions sequentially following the jump instruction by using two no-operation type instructions placed after the jump instruction. A load or store instruction can be used as these no-operation type instructions. Also, a jump instruction must be separated from the previous jump instruction by at least two other non-jump instructions.

During reset, the architecture 10 is loaded with zeros, and the FIFOs 14 and 74 are cleared. The reset line should be held active for at least three clock cycles in order to fully flush out the pipeline. During reset, the first instruction is continually executed. Therefore, the first instruction should be chosen so as not to effect the desired initial state of the CRISP architecture 10, for example, load R0. The next instruction in microcode should contain a loadc instruction, and the first data written into the input FIFO 14 should contain a pointer to an initialization routine. Thus, the CRISP architecture 10 will read its input FIFO 14 until data is available, and the first data that is read out of the input FIFO 14 will be flagged as a control word, causing a jump to the start of the initialization routine. The initialization routine would typically then load initial values from the input FIFO 14, and store them to appropriate register file locations in the register file 18. This assumes that data in the FIFO 14 following the initial control word is contained in the initialization data. Thus, the first block of data contained in the input FIFO 14 after a reset constitutes an initialization frame, with the first word being a control word pointing to the initialization routine, and the subsequent data providing initialization values for the registered file 18. Such an initialization procedure would require that an external processor (not shown) would be able to insert control and initialization data into the input FIFO 14.

The last instruction of the initialization routine would be loadc. The control word that is read next from the input FIFO 14 would cause a jump to a data processing routine, which would read the data it needed for processing from the input FIFO 14. The last instruction of the data processing routine would be another loadc, thus invoking the next data processing routine. Data from a tuner IC and from the external DSP is written into the input FIFO 14 in frames. The first word is a control word which invokes a specified microcode processing routine, and subsequent words in the frame are data samples to be processed by the specified routine. Data from the tuner IC would be framed to invoke the appropriate processing for a given channel, and control messages from the DSP would also be framed to invoke an initialization or other control routine.

Figure 5:
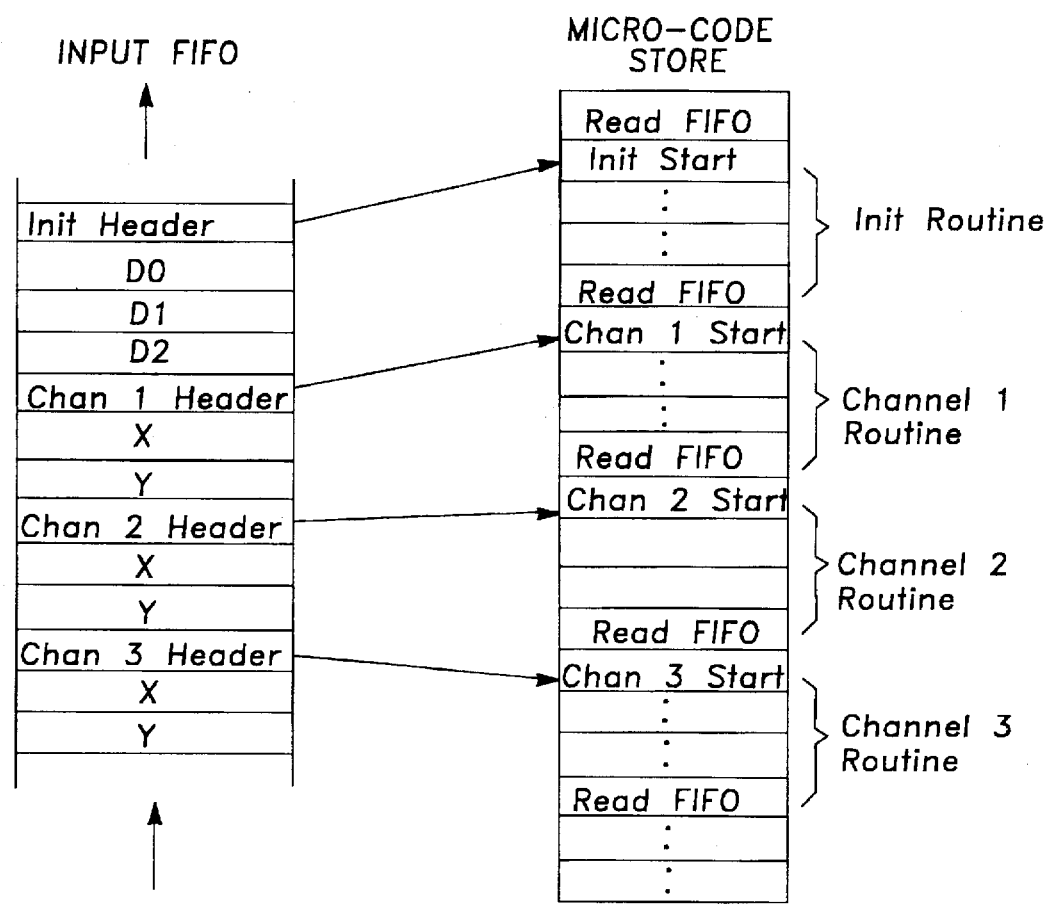
FIG. 5 is a diagrammatic illustration of FIFO data frames in relation to the start of microcode routines of the CRISP architecture of the invention.

To illustrate this, FIG. 5 shows a series of data frame headers stored in the input FIFO 14 where each header points to the start of a microcode routine stored in the microcode store 82.

Certain CRISP algorithms may require that various processing parameters stored in the register file 18 be updated periodically by an external DSP. This may be accomplished by the DSP by writing a control frame into the input FIFO 14. The frame header would invoke a control routine, which would use the remaining data words in the frame to update the parameters stored in the register file 18. This parameter update mechanism is identical to the initialization mechanisms described above.

Since the microcode store 82 is dual ported, with the write side controlled by the DSP microcontroller interface and the read side controlled by the CRISP control unit, the contents of the microcode store 82 may be updated at any time by the external DSP or microcontroller. Direct modification of the microcode may be an effective mechanism to update a single line of code, for example, to change an operand reference from one register file location to another. However, to replace an entire algorithm, a more efficient strategy would be to change the control word used in the frames of a given channel to point to a different routine already stored elsewhere in the microcode RAM.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:

1. An instruction processor architecture for modulating/demodulating an analog waveform, said architecture comprising:

a plurality of digital signal processor (DSP) components, said DSP components performing data operations on data from at least one data bus within the architecture; and a CORDIC processor coupled to the DSP components, said CORDIC processor performing trigonometric functions including angle accumulate operations and vector rotate operations within the architecture, wherein the angle accumulate operations determine a magnitude and a phase angle of a vector given in cartesian coordinates, and the vector rotate operations determine a sine and a cosine of a given phase angle.

2. The architecture according to claim 1 wherein the CORDIC processor includes a first register, a second register and a third register, wherein the magnitude is provided in the first register and the phase angle is provided in the third register for the angle accumulate operations, and the cosine of the given phase angle is provided in the first register and the sine of the given phase angle is provided in the second register for the vector rotate operations.

3. The architecture according to claim 1 wherein the DSP components include an accumulator, said accumulator acting as a main data register of the architecture in which all data operations in the architecture make use of the accumulator.

4. The architecture according to claim 1 wherein the DSP components include a first-in first-out input register responsive to digital input data representative of the analog waveform.

5. The architecture according to claim 1 wherein the DSP components include a first-in first-out output register for outputting modulated/demodulated data.

6. The architecture according to claim 1 wherein the DSP components include a microcode store, said microcode store being a dual port random access memory (RAM) for storing an algorithm for performing the trigonometric functions of the CORDIC processor.

7. The architecture according to claim 1 wherein the architecture performs time division multiplexing so as to modulate/demodulate a plurality of analog waveforms simultaneously.

8. The architecture according to claim 1 wherein the at least one data bus is a 32-bit X data bus and a 16-bit Y data bus.

9. An instruction processor architecture for modulating/demodulating an analog waveform, said architecture comprising:

a plurality of digital signal processor (DSP) components, said DSP components performing data operations on data from at least one data bus within the architecture; and a CORDIC processor coupled to the DSP components, said CORDIC processor performing trigonometric functions for converting polar coordinates to rectangular coordinates and rectangular coordinates to polar coordinates, said trigonometric functions including angle accumulate operations and vector rotate operations, wherein the angle accumulate operations determine a magnitude and a phase angle of a vector given in cartesian coordinates, and the vector rotate operations determine a sine and a cosine of a given phase angle, said CORDIC processor including a first register, a second register and a third register, wherein the magnitude is provided in the first register and the phase angle is provided in the third register for the angle accumulate operations and the cosine of the given phase angle is provided in the first register and the sine of the given phase angle is provided in the second register for the vector rotate operations.

10. The architecture according to claim 9 wherein the DSP components include an accumulator, said accumulator acting as a main data register of the architecture in which all data operations in the architecture make use of the accumulator.

11. The architecture according to claim 9 wherein the architecture performs time division multiplexing so as to modulate/demodulate a plurality of analog waveforms simultaneously.

12. A method of modulating and/or demodulating an analog waveform, said method comprising the steps of:

providing a plurality of digital signal processor (DSP) components;

using the DSP components to perform data operations on data from at least one data bus within the architecture;

providing a CORDIC processor coupled to the DSP components; and using the CORDIC processor to perform trigonometric functions including angle accumulate operations and vector rotate operations within the architecture, wherein the angle accumulate operations determine a magnitude and a phase angle of a vector given in cartesian coordinates, and the vector rotate operations determine a sine and a cosine of a given phase angle.

13. The method according to claim 12 wherein the step of providing a CORDIC processor includes providing a CORDIC processor having a first register, a second register and a third register, and wherein the step of using the CORDIC processor for performing trigonometric functions includes storing the magnitude in the first register and the phase angle in the third register for the angle accumulate operations, and storing the cosine of the given phase angle in the first register and the sine of the given phase angle in the second register for the vector rotate operations.

14. The method according to claim 12 wherein the step of providing a plurality of DSP components includes providing an accumulator, said accumulator acting as a main data register of the architecture in which all data operations in the architecture make use of the accumulator.

15. The method according to claim 12 wherein the step of providing a plurality of DSP components includes providing a first-in first-out input register responsive to digital input data representative of the analog waveform, and providing a first-in first-out output register for outputting modulated/demodulated data.

16. The method according to claim 12 further comprising the step of using the CORDIC processor to perform time division multiplexing by an iterative process so as to modulate/demodulate a plurality of analog waveforms simultaneously.

* * * * *